United States Patent [19]

Roberts, Sr.

[11] Patent Number: 4,506,257
[45] Date of Patent: Mar. 19, 1985

[54] PORTABLE ALL PURPOSE ELECTRICAL ALARM

[76] Inventor: Joseph M. Roberts, Sr., P.O. Box 2383, Alameda, Calif. 94501

[21] Appl. No.: 452,428

[22] Filed: Dec. 23, 1982

[51] Int. Cl.³ .................... G08B 19/00; H01H 3/02
[52] U.S. Cl. .................... 340/521; 200/283; 340/573
[58] Field of Search .............. 340/521, 573; 200/153 LB, 283

[56] References Cited

U.S. PATENT DOCUMENTS

| | | | |
|---|---|---|---|
| 2,922,150 | 1/1960 | Jezl | 340/521 |
| 4,264,892 | 4/1981 | Zonn | 340/521 |

Primary Examiner—James J. Gill
Attorney, Agent, or Firm—Flehr, Hohbach, Test, Albritton & Herbert

[57] ABSTRACT

A simple and rugged alarm which is versatile in application includes a battery connected through first and second parallel switches to a light and buzzer alarm. The first switch comprises a first contact formed in a conductive plate and yieldably biased to an open position and a lever actuated cam for rotatably engaging and moving the first contact to a closed position. The second switch includes a second contact formed in the conductive plate which is yieldably biased to a closed position and a retractable pin for supporting the second contact in an open position.

9 Claims, 11 Drawing Figures

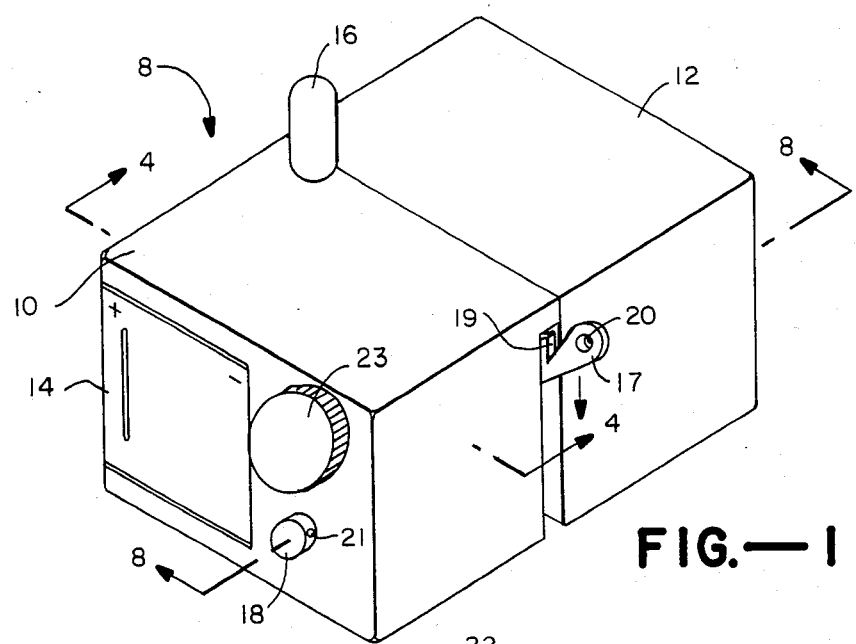
FIG.—1
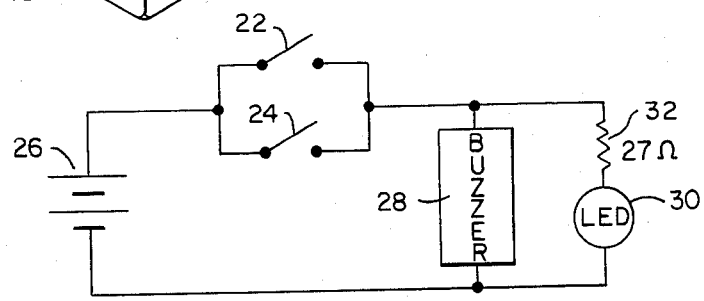
FIG.—2
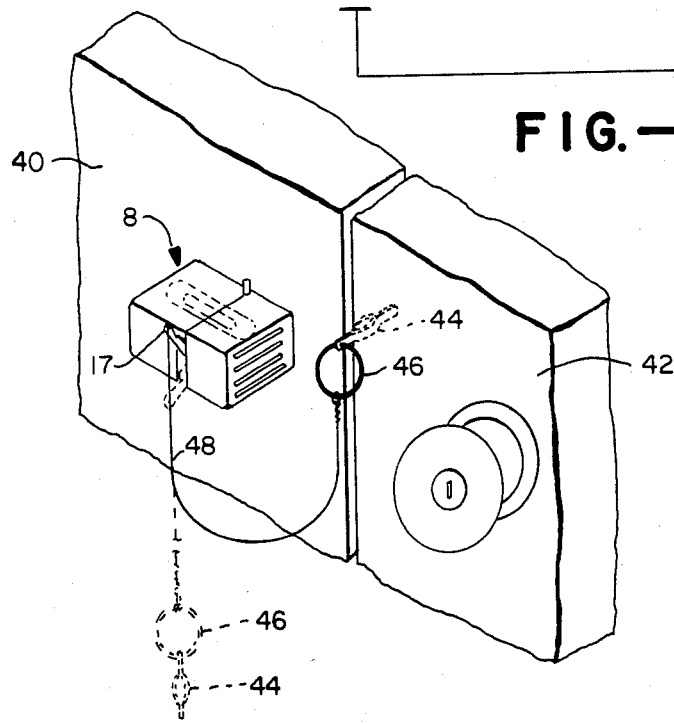
FIG.—3A

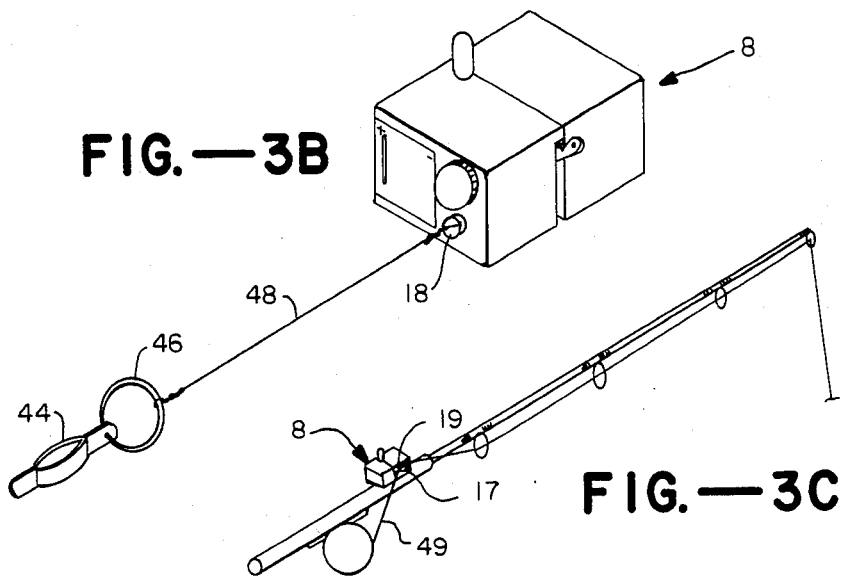
FIG.—3B
FIG.—3C
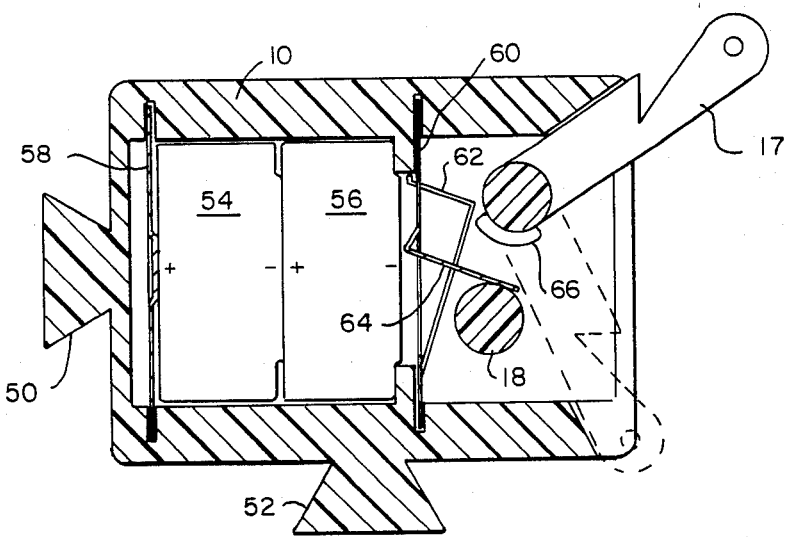
FIG.—4
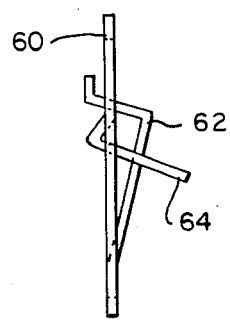
FIG.—5A
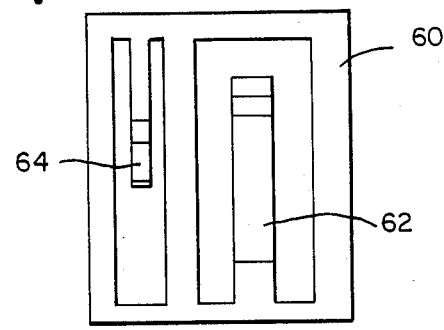
FIG.—5B

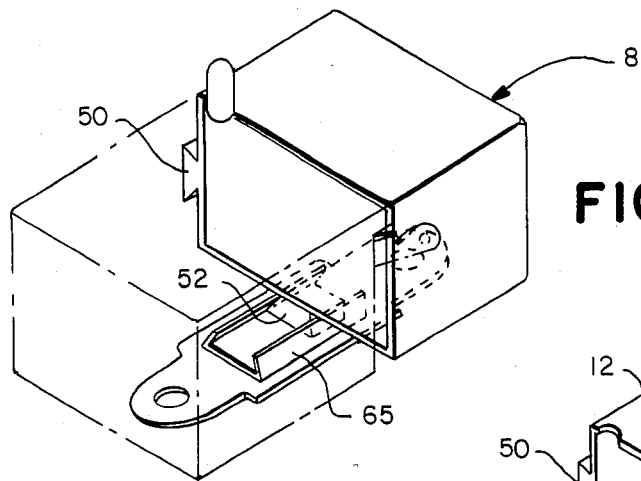
FIG.—6
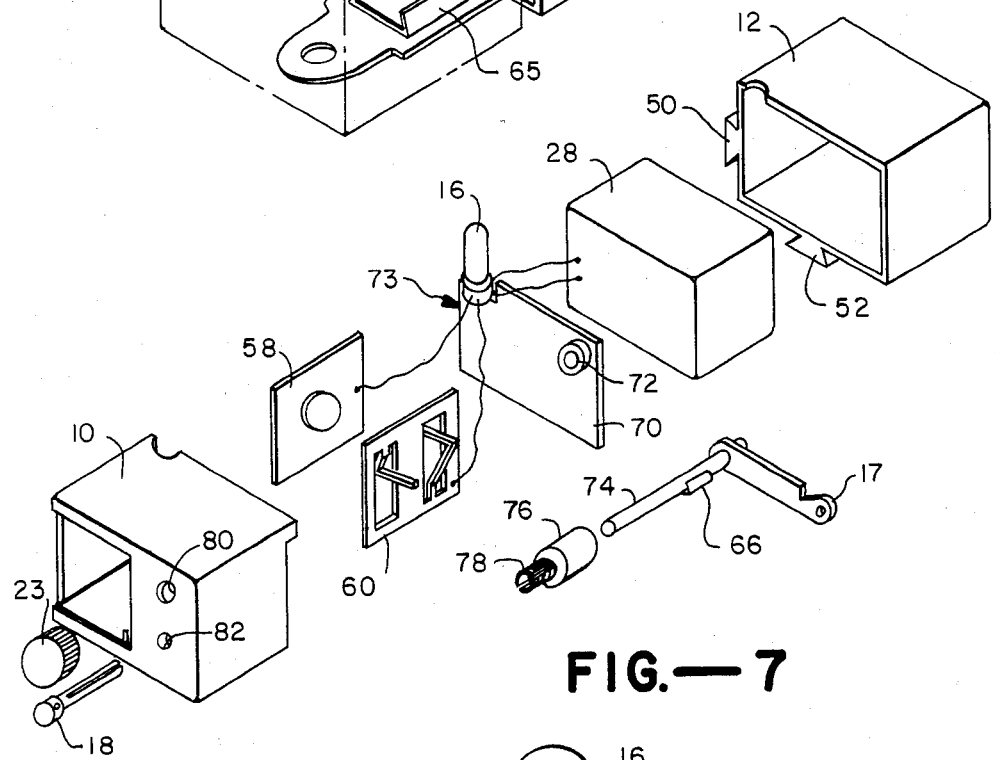
FIG.—7
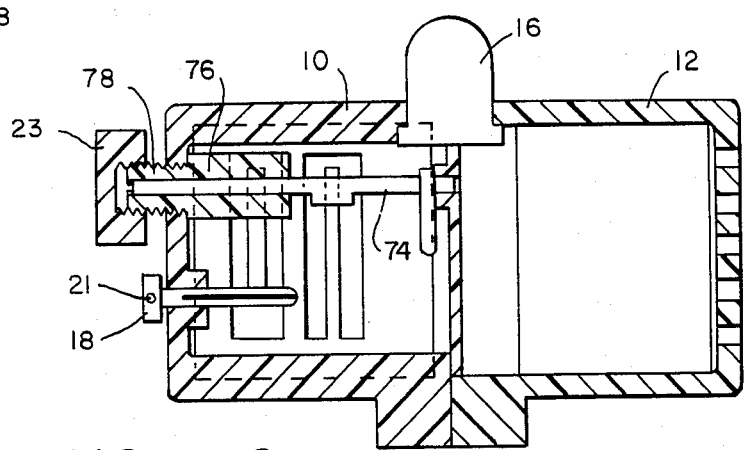
FIG.—8

PORTABLE ALL PURPOSE ELECTRICAL ALARM

This patent application is related to copending U.S. application Ser. No. 06/223,439 filed Jan. 8, 1981, for "Simple and Rugged Fishing Alarm", now U.S. Pat. No. 4,398,185.

This invention relates generally to alarm devices, and more particularly the invention relates to electrical alarms which are battery operated.

Disclosed in copending U.S. application Ser. No. 06/223,439, supra, is a simple and rugged battery operated electrical alarm which is particularly designed for fishing applications. The alarm has a buzzer and light which are energized by the closing of a rotatable switch in response to pull on the fishing line of the rod and reel. The rotatable switch includes a planar member with two spaced conductive layers and a wiper blade which is rotated to contact and interconnect the two layers. A rotatable screw is provided to adjust drag on the switch.

The present invention is an improved electrical alarm which is more versatile in application and which is small and simple in construction. The alarm includes a housing which can be injection molded and assembled without requiring mechanical fasteners. A sound alarm and a light alarm are provided in a first portion of the housing, and a battery power source is provided in an adjacent portion of a housing. Cooperatively positioned therewith is a switch means for energizing the alarm from the battery source.

Advantageously, the switch means can be actuated by either a rotatable switch or a pin actuated switch. The switch includes a conductive sheet of material such as copper in which switch contacts are formed and which complete an electrical circuit in response to the switch actuation. The switch contacts comprise portions of two parallel connected switches which are actuated by a rotatable lever and by extraction of a pin.

The invention and objects and features thereof will be more readily apparent from the following detailed description and appended claims when taken with the drawing, in which:

FIG. 1 is a perspective view of an electrical alarm in accordance with one embodiment of the invention.

FIG. 2 is an electrical schematic of the alarm of FIG. 1.

FIGS. 3A-3C are perspective views illustrating operation of the alarm of FIG. 1 in different applications.

FIG. 4 is a section view of the alarm of FIG. 1 taken along the line 4—4 of FIG. 1.

FIG. 5A and FIG. 5B are a side view and a front view, respectively, of a formed conductive sheet in the switch of the alarm in FIG. 1.

FIG. 6 is a perspective view illustrating the mounting of the alarm.

FIG. 7 is an exploded perspective view of the alarm of FIG. 1.

FIG. 8 is a section view of the alarm of FIG. 1 taken along the line 8—8.

Referring now to the drawing, FIG. 1 is a perspective view of a portable all purpose electrical alarm shown generally at 8 in accordance with one embodiment of the invention. The alarm includes a housing comprising a battery module 10 and an alarm module 12 which are preferably injection molded and which can be assembled without requiring mechanical fasteners. As will be described further hereinbelow, batteries are mounted in the module 10 through a door 14 which snaps into housing portion 10, and a buzzer is mounted in the module 12. An electrical light 16 is mounted on a plate within the housing, as will be described with reference to FIG. 6, with the light 16 extending through the mating housing portions 10 and 12.

In a preferred embodiment the alarm is actuated by one of two switches, one of which includes a rotatable arm 17 and the other of which includes a retractable pin 18. Lever 17 includes a notch 19 for engaging a fishing line, for example, and hole 20 through which a line may be tied. Pin 18 also has a hole 21. A drag screw cap 23 is provided for adjusting tension on the lever 17, as will be described hereinbelow. FIG. 2 is an electrical schematic of the alarm in which the two switches 22 and 24 are connected in parallel and serially connect the battery source 26 with the buzzer alarm 28 and the light alarm which comprises a light emitting diode 30 and the serially connected resistor 32. Thus, actuation of either switch 22 or 24 will energize the buzzer 28 and the light emitting diode 30. Since the buzzer 28 and the light emitting diode 30 are connected in parallel, either alarm can be actuated whether or not the other alarm is operating.

The described alarm is simple and rugged in structure and is compact in size. Typical dimensions of the housing are one inch in length, one-half inch in height, and three-fourth inch in width. Accordingly, the switch is very versatile in application.

FIG. 3A is a perspective view illustrating one application of the alarm 8 mounted on a wall 40 and actuated in response to the opening of a door 42. A wedge member 44 is provided between the door 42 and the wall 40, The wedge 44 is attached to a ring 46 and cord 48 to the lever 17 of the alarm. Upon opening of the door 42 the wedge is released and the weight thereof is sufficient to rotate the lever 17 thus actuating the buzzer and light emitting diode of the alarm 8.

FIG. 3B is a perspective view illustrating another mode of operation of the alarm 8. In this embodiment the wedge 44 or ring 46 can be tied to an object such as a sliding window or sliding door, and movement of the object extracts the pin 18 thereby actuating the alarm. FIG. 3C illustrates the alarm with a rod and reel as a fish alarm. The fishing line 49 engages the notch 19 in the top of lever 17.

FIG. 4 is a section view of the alarm 8 taken along the line 4—4 through the module 10 of the housing as shown in FIG. 1. The modules 10 and 12 are provided with lug extensions 50 and 52 which facilitate the mounting of the alarm on a wall and the like to a latch base fastened thereto, as will be described with reference to FIG. 6. Within module 10 are the batteries 54 and 56 which are maintained in a press fit against a conductive plate 58 mounted in slots in module 10. Also mounted in slots in module 10 is a second plate 60 in which two switch contacts 62 and 64 are formed.

The switch contact 62 is biased away from battery 56, and rotation of the lever 17 causes a cam surface 66 to engage and force contact 62 into electrical contact with battery 56. The switch contact 64 is spring biased to engage the battery 56 but is maintained in a non-contact position by the pin 18. Thus, withdrawal of the pin 18 releases the biased contact 64 for electrical engagement with the battery 56.

FIGS. 5A and 5B are a side view and front view, respectively, of the conductive plate 60 and the switch contacts 62 and 64. The plate 60 is preferably a sheet of conductive material such as copper in which the arms 62 and 64 are formed by a suitable stamping operation. The arms 62 and 64 are then formed by suitable means in the configuration illustrated in FIG. 4 and FIG. 5A. The arms have suitable spring bias to operation as described above with reference to FIG. 4.

FIG. 6 illustrates the mounting of the alarm 8 on a snap lock base 65. The bottom lug 52 (or side lug 50) slides into engagement with opposing flanges of the base 65 which is mounted on a wall or on a fishing rod. Thus, the alarm is readily mounted without the need for tape and the like and is easily removed. Further, the provision of lugs on the bottom and on the side of the alarm facilitates proper orientation for the intended use.

FIG. 7 is an exploded perspective view of the alarm of FIG. 1. As illustrated, the buzzer 28 is mounted within module 12 and the batteries (not shown) are mounted in module 10. The light 16 is mounted on a support plate 70 which is positioned between the two housing portions 10, 12. Electrical wires shown generally at 73 connect the plates 58 and 60 to the light 16 and the buzzer 28.

Plate 70 includes a bushing portion 72 which supports one end of a shaft 74 on which the cam 66 and lever 17 are mounted. The other end of shaft 74 is received by a bushing 76 which has a slotted, threaded portion 78 that extends through a hole 80 in module 10 and is received by the drag cap 23. As shown in the section view of FIG. 8, the cap 23 squeezes the tapered slotted portion 78 of bushing 76 as the cap 23 is screwed on. The portion 78 then engages the shaft 74 thereby providing drag on rotation of the shaft 74. The pin 18 extends through a hole 82 in module 10 and supports the contact arm 64 on plate 60.

The electrical alarm in accordance with the invention is simple and rugged in construction. The small size and the dual switch operation allows the alarm to offer flexibility and versatility in application ranging from a door and window alarm in the home to a fish alarm in outdoor use.

While the invention has been described with reference to a specific embodiment, the description is illustrative of the invention and is not to be construed as limiting the invention. For example, the plate 60 can be at a different orientation with respect to the pin 18 and cam 66, and the cap 23 can create drag by engaging the end of shaft 74 if the shaft extends out of the bushing 76. Thus, various modifications and applications may occur to those skilled in the art without departing from the true spirit and scope of the invention as defined by the appended claims.

What is claimed is:

1. An electrical alarm comprising
a housing,
a buzzer mounted in one portion of said housing,
an electrical battery power source mounted in another portion of said housing,
a plate positioned between said battery power source and said buzzer,
an electrical light mounted on said plate and extending through said housing, and
means including switch means electrically connecting said buzzer and said light to said battery power source, said switch means including a first rotatable lever actuated switch and a second pin actuated switch.

2. The electrical alarm as defined by claim 1 wherein said switch means includes a conductive plate and said first rotatable lever actuated switch includes a first contact formed in said conductive plate which is yieldably biased away from said battery power source and moves into engagement with said battery power source in response to rotation of said rotatable lever actuated switch, and said second pin actuated switch includes a second contact formed in said conductive plate and yieldably biased to engage said battery power source and a pin extending through said housing and supporting said second contact away from said battery power source.

3. The electrical alarm as defined by claim 2 wherein said rotatable lever actuated switch further includes a shaft rotatably mounted in said housing, a lever attached to said shaft and extending outside of said housing, and a cam mounted on said shaft and engaging said first contact in response to rotation of said shaft.

4. The electrical switch as defined by claim 3 and further including a bushing having a threaded portion extending through said housing, said shaft being positioned in said bushing, and further including drag adjustment means engaging said threaded portion and establishing a drag on said shaft.

5. The electrical alarm as defined by claim 4 wherein said threaded portion is slotted to comprise flexible arms, and said drag adjustment means comprises a cap for threadably engaging said threaded portion and flexing said arms into engagement with said shaft.

6. The electrical alarm as defined by claim 3 wherein said lever includes a notched surface for receiving a fishing line.

7. The electrical alarm as defined by claim 1 wherein said housing includes at least one lug extension for fastening said alarm to a mating base.

8. The electrical alarm as defined by claim 7 and further including a mounting base, said mounting base having opposing flange members for slidably engaging said at least one lug extension.

9. For use in an electrical alarm, switch means comprising a conductive plate, a first contact formed in said conductive plate which is yieldably biased to an open position, lever actuated cam means for rotatably engaging and moving said first contact to a closed position, a second contact formed in said conductive plate which is yieldably biased to a closed position, and retractable pin means for supporting said second contact in an open position.

* * * * *